(12) United States Patent
Wang et al.

(10) Patent No.: US 10,732,289 B1
(45) Date of Patent: Aug. 4, 2020

(54) LDACS-BASED AIR-GROUND COOPERATIVE POSITIONING AND INTEGRITY MONITORING METHOD

(71) Applicant: Beihang University, Beijing (CN)

(72) Inventors: Zhipeng Wang, Beijing (CN); Yanbo Zhu, Beijing (CN); Xin Li, Beijing (CN); Kun Fang, Beijing (CN); Jingtian Du, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/713,241

(22) Filed: Dec. 13, 2019

(30) Foreign Application Priority Data

Nov. 7, 2019 (CN) .......................... 2019 1 1081240

(51) Int. Cl.
*G01S 19/07* (2010.01)
*G01S 19/15* (2010.01)

(52) U.S. Cl.
CPC .............. *G01S 19/07* (2013.01); *G01S 19/15* (2013.01)

(58) Field of Classification Search
CPC .................................. G01S 19/07; G01S 19/15
See application file for complete search history.

(56) References Cited

U.S. PATENT DOCUMENTS

2019/0179033 A1* 6/2019 Sasaki ...................... H04K 3/90

* cited by examiner

*Primary Examiner* — Marc Anthony Armand
(74) *Attorney, Agent, or Firm* — Locke Lord LLP; Tim Tingkang Xia, Esq.

(57) ABSTRACT

The present invention provides a LDACS-based air-ground cooperative positioning method. According to the method, on the basis of LDACS, users are classified into super-high-altitude users, high-altitude users, and low-altitude users, and air-ground cooperative positioning is implemented through information exchange among the users at the three levels. Meanwhile, a new fault mode and an integrity hazard are introduced into the method. Therefore, the present invention further provides a method for monitoring the integrity of a LDACS-based air-ground cooperative positioning method, including a fault detection algorithm and a protection level solving method; and proposes a method for evaluating the complexity of integrity monitoring. The LDACS-based air-ground cooperative positioning method provided in the present invention well solves the problem of the shortage of APNT services in poor terrain conditions, making the positioning results more accurate.

8 Claims, 3 Drawing Sheets

LDACS-BASED AIR-GROUND COOPERATIVE POSITIONING AND INTEGRITY MONITORING METHOD

CROSS-REFERENCE TO RELATED PATENT APPLICATION

This non-provisional application claims priority to and the benefit of, pursuant to 35 U.S.C. § 119(a), patent application Serial No. CN201911081240.8 filed in China on Nov. 7, 2019. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

TECHNICAL FIELD

The present invention relates to the field of satellite navigation technologies, and in particular, to a LDACS-based air-ground cooperative positioning and integrity monitoring method.

BACKGROUND

The Global Navigation Satellite System (GNSS) is an accurate provider of Global Position, Navigation and timing (PNT) information, depending on capable receivers and dense satellite constellations. GNSS users generally assume that the position and timing information provided by their receivers is completely accurate, but for more complex users, their requirements go beyond accuracy and extend to the integrity of GNSS information.

Integrity refers to the capability of a system to provide a timely alarm to users when GNSS signals and the system are unavailable for navigation. A wide-area enhancement system calculates a difference correction number at the central station and provides the users with integrity information. In other words, through the monitoring of GNSS signals, the integrity of GNSS satellites and ionospheric grid points is analyzed and alarm information indicating "do not use" is sent. When the system cannot determine the integrity of the GNSS satellites or ionospheric grid points, it sends information indicating "unmonitored" to the users.

Providing accurate positioning, navigation and timing services is crucial to Air Traffic Management (ATM), especially in civil aviation, which is a major concern for safety. In this sense, SESAR and NextGen have identified the use of GNSS as the primary future navigation system for civil aviation. However, due to the low power level of GNSS signals, SESAR and NextGen may be prone to faults, resulting in disruption of navigation services. In fact, the high threat of radio frequency interference leads to the need for a GNSS backup system designed to provide civil aviation navigation services when the GNSS is unavailable, i.e., an Alternative Position, Navigation and timing (APNT) system. APNT refers to a separate non-GNSS system designed to provide PNT information during the unavailability of the GNSS. The broad recognition of the Global Positioning System (GPS) vulnerability in the Volpe report spurs further exploration of the APNT system, including the development of eLoran in the United States and Europe, general work on ranging signals, DME-DME positioning, and the European R model. The work is intended to combine observable measurements of two systems through loosely or tightly coupled integrated receivers to produce as good PNT information as possible. In fact, since the accuracy of APNT positioning solution is usually lower than that of GNSS positioning solution, the accuracy of the comprehensive positioning result obtained through the above work is almost equal to that of GNSS positioning alone. Nevertheless, due to the unavailability of the GNSS, the APNT services should still be valued, and the goal in the future should be to improve the positioning accuracy of the APNT services.

At present, the following problems exist in the implementation and application of the APNT services under different terrain conditions. The first problem is as follows: for users at medium altitudes, terrain and urban features may cause partial occlusion of the ranging source; although the APNT services may still be implemented normally, their positioning and timing results are not very accurate and may have a large error. The second problem is as follows: for users at low altitudes, the occlusion of the ranging source is more serious. Under such conditions, the implementation of the APNT services is more difficult. For example, when GNSS service is unavailable in a canyon airport, aircraft positioning is a great challenge.

In view of the above two problems, corresponding solutions are given in the existing research. For the first problem, in previous studies, most scholars classify high-altitude users and super-high-altitude users into the same category, and conducts positioning based solely on a limited number of ground ranging sources. Since the ground ranging sources available to the high-altitude users are fewer than those available to the super-high-altitude users, it is not reliable though the positioning solution can be obtained.

For the second problem, with the comprehensive deployment of the GNSS, the idea of air-to-air positioning has been put forward so as to obtain a more accurate positioning solution when the GNSS is unavailable and the available ground ranging sources of the low-altitude users cannot support its positioning. That is, if a high-altitude aircraft has enough available ground ranging measurements, it can calculate the position solution and become an airborne ranging source to assist a low-altitude aircraft in positioning, especially for an aircraft in a canyon airport. Conversely, the high-altitude users cannot take advantage of the low-altitude users to conduct positioning, because the "layered" aspect of A2A positioning means that users have to resort to ranging sources with positioning solutions. Although the air-to-air method can be used for positioning low-altitude users, the accuracy is still quite different compared with the conventional GNSS positioning solution.

Besides, in the study of APNT integrity, a Receiver Autonomous Integrity Monitoring (RAIM) algorithm is mostly introduced into fault detection, which solves a protection level and performs a series of performance evaluation by calculating a fault slope. However, with the development of the GNSS, the conventional RAIM algorithm is no longer suitable for multi-navigation systems, and its application scenarios are not limited to the ocean route stage.

SUMMARY

Thus, to solve the problems existing in the prior art, the present invention provides a LDACS-based air-ground cooperative positioning method and a method for monitoring the integrity thereof, which are specifically as follows.

The present invention provides a LDACS-based air-ground cooperative positioning method. In the positioning method, users are classified into three levels, super-high altitude, high altitude, and low altitude, and air-ground cooperative positioning is implemented through information exchange among the three levels. The method includes the following steps of:

a) locating the super-high-altitude users by using an existing ground ranging source, and the super-high-altitude users obtaining information from the existing ground ranging source to obtain a high-accuracy position solution, broadcasting their position estimation and covariance matrix to the high-altitude users and the low-altitude users, and becoming a super-high-altitude airborne ranging source;

b) the high-altitude users receiving the position estimation and covariance matrix broadcast by the super-high-altitude airborne ranging source, and implementing air-to-air positioning in combination with a distance value measured by a LDACS two-way ranging method;

increasing the number of available ground ranging sources, and the high-altitude users estimating their position according to position and error information of the available ground ranging sources and in combination with the distance value measured by the LDACS two-way ranging method, to implement air-to-ground positioning; and combining air-to-air and air-to-ground positioning results to improve the accuracy of the positioning result, and after a more accurate positioning result is obtained, the high-altitude users becoming a high-altitude airborne ranging source;

c) the low-altitude users implementing air-to-air positioning according to the position information broadcast by the super-high-altitude users and the high-altitude users and ranging error information reflected by the covariance matrix in combination with the distance value measured by the LDACS two-way ranging method; and increasing the number of ground ranging sources, and the low-altitude users receiving distance measurement values and error information of the ground ranging sources, and estimating their position in combination with the distance value measured by the LDACS two-way ranging method, to implement air-to-ground positioning.

Further, in the LDACS two-way ranging method, a distance between a ranging source and an aircraft is estimated according to the following formula:

$$r^{(m)} = (t_2 - t_1) \times v$$

where $t_1$ is the time of a query; $t_2$ is the response time of a query response; $v$ is a signal propagation speed.

Further, a distance between the ranging source and a user aircraft can be calculated according to an aircraft position solution, a ranging source position solution, and an error, and a specific calculation formula is as follows:

$$r^{(m)} = (x_u - x^{(m)}) \cdot 1^{(m)} + T^{(m)} + M^{(m)} + \varepsilon^{(m)}$$

where $x_u$ is a user aircraft position solution; $x^{(m)}$ is a ranging source position solution; $\varepsilon^{(m)}$ is a ranging error; $T^{(m)}$ is a tropospheric delay; $M^{(m)}$ is a multipath effect; $1^{(m)}$ is a line of sight (LOS) vector, which is a set of unit vectors along a connection line between the user aircraft and the ranging source;

the tropospheric delay $T^{(m)}$ and the multipath effect $M^{(m)}$ are negligible.

Further, after a new fault mode and an integrity hazard are introduced into the air-ground cooperative positioning method, the distance between the ranging source and the user aircraft is calculated according to the following formula:

$$r^{(m)} = (x_u - (x^{(m)} + \Delta x^{(m)})) \cdot 1^{(m)} + \Delta r^{(m)} + \varepsilon^{(m)}$$

where $x_u$ is a user aircraft position solution; $x^{(m)}$ is a ranging source position solution; $\Delta x^{(m)}$ is an error term of a position error of the ranging source; $\varepsilon^{(m)}$ is a ranging error; $\Delta r^{(m)}$ is a ranging fault; $1^{(m)}$ is a line of sight (LOS) vector, which is a set of unit vectors along a connection line between the user aircraft and the ranging source;

the ranging fault $\Delta r^{(m)}$ satisfies the formula: $\Delta r^{(m)} = \Delta x^{(m)} \cdot 1^{(m)}$, and then a fault range measurement formula is obtained specifically as follows:

$$r^{(m)} = (x_u - x^{(m)}) \cdot 1^{(m)} + \Delta r^{(m)} + \varepsilon^{(m)}$$

Further, the ranging error $\varepsilon^{(m)}$ follows a Gaussian distribution with a mean value of 0, and the variance of the ranging error $\varepsilon^{(m)}$ is in line with the formula: $\sigma_{m,j}^2 = \sigma_r^2 + \|\Sigma_j \cdot 1_{m,j}\|$, where $\sigma_{m,j}^2$ denotes the variance of the ranging error, $\sigma_r$ is ranging noise, and it is assumed that $\sigma_r = 10$ m.

The present invention further provides a technique for monitoring the integrity of a LDACS-based air-ground cooperative positioning method, including the following steps of:

a) calculating positioning solutions using all ranging sources, including:

the calculation formula of the covariance matrix $\Sigma$ of the position of the ranging source being as follows:

$$\Sigma = G^T M G$$

where M is a weight matrix, reflecting the uncertainty of the position of the ranging source; G is a geometric matrix, consisting of a set of unit vectors $1^{(k)}$ along the connection line direction (LOS) obtained by combining a known position of the ranging source with an assumed position of a user receiver;

wherein, for air-to-ground positioning, if the same technique is used for all measurements, M can be approximated as a unit matrix; for air-to-air positioning, M is equivalent to an ephemeris error in satellite navigation positioning; therefore, expressions of a ranging source position covariance matrix $\Sigma_{int}$ representing the integrity and a ranging source position covariance matrix $\Sigma_{acc}$ representing accuracy and continuity are as follows:

$$\Sigma_{int} = G^T \sigma_{URE}^2 G$$

$$\Sigma_{acc} = G^T \sigma_{URA}^2 G$$

during the positioning, the ranging error is described by adding the noise $\sigma_r$ in the ranging measurement to the uncertainty of the position of the ranging source along the connection line between the range source j and the user receiver m, and a ranging error diagonal covariance matrix $C_{int}$ (integrity) and $C_{acc}$ (accuracy and continuity) are calculated as follows:

$$C_{int} = \|(G^T \sigma_{URE}^2 G) 1_{m,j}\| + \sigma_r^2$$

$$C_{acc} = \|(G^T \sigma_{URA}^2 G) 1_{m,j}\| + \sigma_r^2$$

where $\sigma_r$ is ranging error, indicating the noise of distance measurement caused by signal tracking at the receiver, and it is assumed that $\sigma_r = 10$ m; $1_{m,j}$ denotes a unit vector along the connection line between the ranging source and the user receiver;

the positioning solution is calculated with the weighted least square method, and the calculation formula is as follows:

$$\hat{x} = (G^T W G)^{-1} G^T W y$$

where W is a weighted matrix, and $W = C_{int}^{-1}$;

the geometric matrix G iteratively searches for the best position estimation, and when the positioning solution converges, y is a difference between a distance measurement value, which is based on the position of the ranging source and the positioning solution, and an expected value;

b) calculating a subset positioning solution, a standard deviation, and a bias component after removal of an assumed fault source, including:

calculating a residual y under a fault mode k with the weighted least square method to calculate the subset positioning solution:

$$\Delta \hat{x}^{(k)} = \hat{x}^{(k)} - \hat{x}^{(0)} = (S^{(k)} - S^{(0)}) y$$

$$S^{(k)} = (G^T W^{(k)} G)^{-1} G^T W^{(k)}$$

where $\hat{x}^{(k)}$ is a positioning solution after removal of an assumed fault ranging source, which is a subset positioning solution, $\hat{x}^{(0)}$ is a positioning solution using all ranging sources, which is a complete-set positioning solution; S is a transfer matrix;

wherein the variance of the subset positioning solution $\hat{x}_q^{(k)}$ is: $\sigma_q^{(k)2} = (G^T W^{(k)} G)_{q,q}^{-1}$ where q=1, 2, 3 denotes east, north and high directions respectively;

an effect of a nominal bias component $b_{nom,i}$ on the subset positioning solution $\hat{x}_q^{(k)}$ is as follows:

$$b_q^{(k)} = \sum_{i=1}^{N_{sat}} |S_{q,i}^{(k)}| b_{nom,i}$$

an equation of the difference $\Delta \hat{x}^{(k)}$ between the subset positioning solution and the complete-set positioning solution is calculated as follows:

$$\sigma_{ss,q}^{(k)2} = e_q^T (S^{(k)} - S^{(0)}) C_{acc} (S^{(k)} - S^{(0)})^T e_q$$

where $e_q$ denotes a vector in which the $q^h$ element is 1 and other elements are 0;

c) conducting split testing on the positioning solution to judge whether a protection level is solved, and if yes, solving the protection level, including:

for the fault mode k, $\hat{x}_q^{(0)}$ being a fault-free positioning solution, and $x_q$ being an actual position; $\hat{x}_q^{(k)}$ being a positioning solution of a detection subset k after removal of the $k^{th}$ measured value, wherein q=1,2, 1 and 2 denote two directional components of the horizontal plane respectively; and a difference $\nabla x_q$ between an estimated position $\hat{x}_q^{(k)}$ and an actual position $\hat{x}_q^{(0)}$ is:

$$\nabla x_q = \hat{x}_q^{(0)} - x_q$$

test statistics $t_{k,q}$ under the fault mode k is:

$$t_{k,q} = |\hat{x}_q^{(k)} - \hat{x}_q^{(0)}|$$

a threshold $T_{k,q}$ of the test statistics under the fault mode k is:

$$T_{k,q} = K_{fa,q} \sigma_{ss,q}^{(k)2}$$

where $K_{fa,q}$ is an inverse function (quantile) of a probability cumulative distribution function, the specific value is determined by a continuity risk assigned to the fault mode k, and calculation formulas of the continuity risk are as follows:

$$\tau_k = \frac{|\hat{x}^{(k)} - \hat{x}^{(0)}|}{T_k} \leq 1$$

$$K_{fa,q} = Q^{-1}\left(\frac{P_{fa}^{(k)}}{4}\right)$$

$P_{fa}^{(k)}$ is a continuity budget assigned to the fault mode k, $Q^{-1}(p)$ is (1−p) quantile of standard Gaussian distribution, $\tau_k$ is test statistics, and if the test statistics $\tau_k$ is greater than 1, the assumption of the fault mode is established, and a fault exists in the correspondingly removed ranging source;

the protection level is further solved, the protection level is an important parameter to evaluate availability, and a horizontal protection level (HPL) and a vertical protection level (VPL) are calculated as follows respectively under APNT services:

$$VPL = \kappa_{(PL)} \cdot \sigma_q^{(k)}$$

$$HPL = \kappa_{(PL)} \cdot \sqrt{S^{(k)} \cdot \sigma_q^{2(k)}} + \sum_i |S^{(k)} \cdot b_{nom}|$$

where $b_{nom}$ is a bias component, $\sigma_q^{(k)}$ is a standard deviation of the subset solution of Gaussian distribution, and $\kappa_{(PL)}$ is an inflation factor with the value of 5.33;

the availability of the system can be judged by comparing the protection level with a corresponding alarm limit, and if the protection level is less than the alarm limit, the complete-set solution will be taken as the positioning solution; otherwise, the system will be indicated to be unavailable.

Further, whether the integrity monitoring can be easily implemented in a large area needs to be judged by the complexity of the integrity monitoring.

Further, a chi-square test threshold $T_{\chi^2}$ is used as a measurement index for the complexity of the integrity, and $T_{\chi^2}$ is calculated as follows:

$$F(T_{\chi^2}, n-3-N_{rs}) = 1 - P_{FA\_CHI2}$$

where the operator F(u, deg) is a cumulative distribution function of chi-square distribution of which the degree of freedom is deg; $N_{rs}$ is the number of ranging sources with a simultaneous fault; n is the total number of the ranging sources;

integrity monitoring thresholds $T_{\chi^2}$ of APNT services at different positions in a region are summarized for analysis, the region is divided into grids to obtain a series of integrity monitoring thresholds $T_1, T_2, T_3, \ldots, T_n$, and then a change rate of the complexity of the integrity monitoring is defined as the following formula:

$$\Delta = \frac{1}{n-1} \sum_i^n [T_i - \overline{T}]^2$$

the closer Δ is to 0, the smaller the change amplitude of the overall data is, and it is easier to implement the integrity monitoring in a large area; otherwise, it is somewhat complex to implement the integrity monitoring in a large area.

Compared with the prior art, the present invention has the following beneficial effects.

1. The present invention provides a LDACS-based air-ground cooperative positioning method. The positioning method is a positioning method provided for low-altitude users such as an aircraft at a canyon airport when GNSS positioning is unavailable. In the method, users are classified into three levels, super-high altitude, high altitude, and low altitude. Through information exchange between the users at the three levels in combination with two-way ranging of air-to-air and air-to-ground, the positioning results are more accurate without a large number of ground facilities.

2. The present invention provides a technique for monitoring the integrity of a LDACS-based air-ground cooperative positioning method, in which a fault detection algorithm suitable for APNT services and LDACS positioning algorithms is described, making the solution of the integrity monitoring threshold and the protection level more convincing, helping promote the comprehensive application and development of APNT service, and narrowing the gap between APNT positioning and GNSS positioning.

It should be understood that the above general description and subsequent detailed description are illustrative descriptions and explanations, and shall not be used as limitations to the content for which protection is sought by the present invention.

BRIEF DESCRIPTION OF DRAWINGS

More objectives, functions, and advantages of the present invention are illustrated by the following description of embodiments of the present invention with reference to the accompanying drawings, in which.

DETAILED DESCRIPTION

Figure 1:
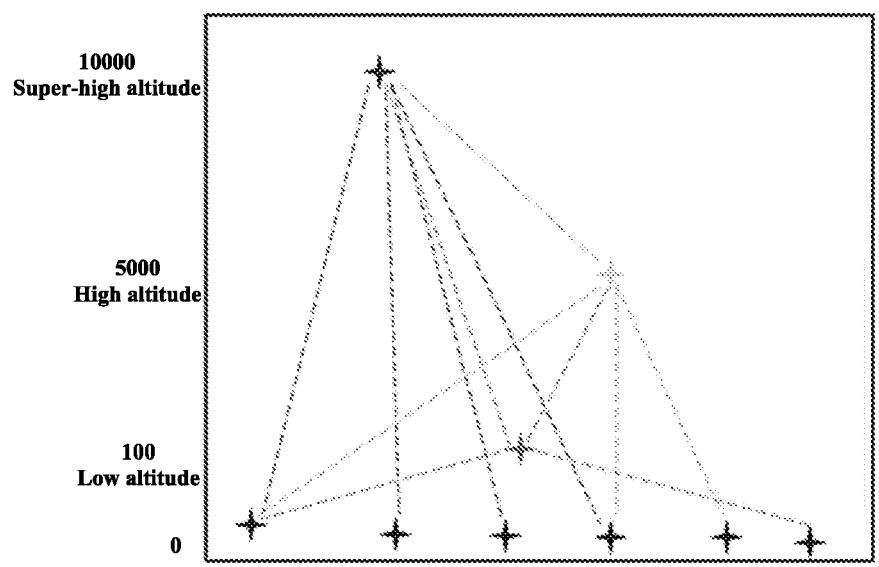
FIG. 1 is a scenario diagram of air-ground cooperative positioning.

The objectives and functions of the present invention and the methods for achieving these objectives and functions will be clarified with reference to exemplary embodiments. However, the present invention is not limited to the following disclosed exemplary embodiments. It can be implemented in different forms. The essence of the specification is merely to help those skilled in the art to comprehensively understand specific details of the present invention.

Embodiments of the present invention will be described below with reference to the accompanying drawings. In the drawings, identical reference numerals represent identical or similar parts, or identical or similar steps. A LDACS-based air-ground cooperative positioning method and a method for monitoring the integrity thereof according to the present invention are described below through specific embodiments.

A LDACS-based air-ground cooperative positioning method and a method for monitoring the integrity thereof are provided in this embodiment, which will be described in detail in the following four parts.

Figure 2:
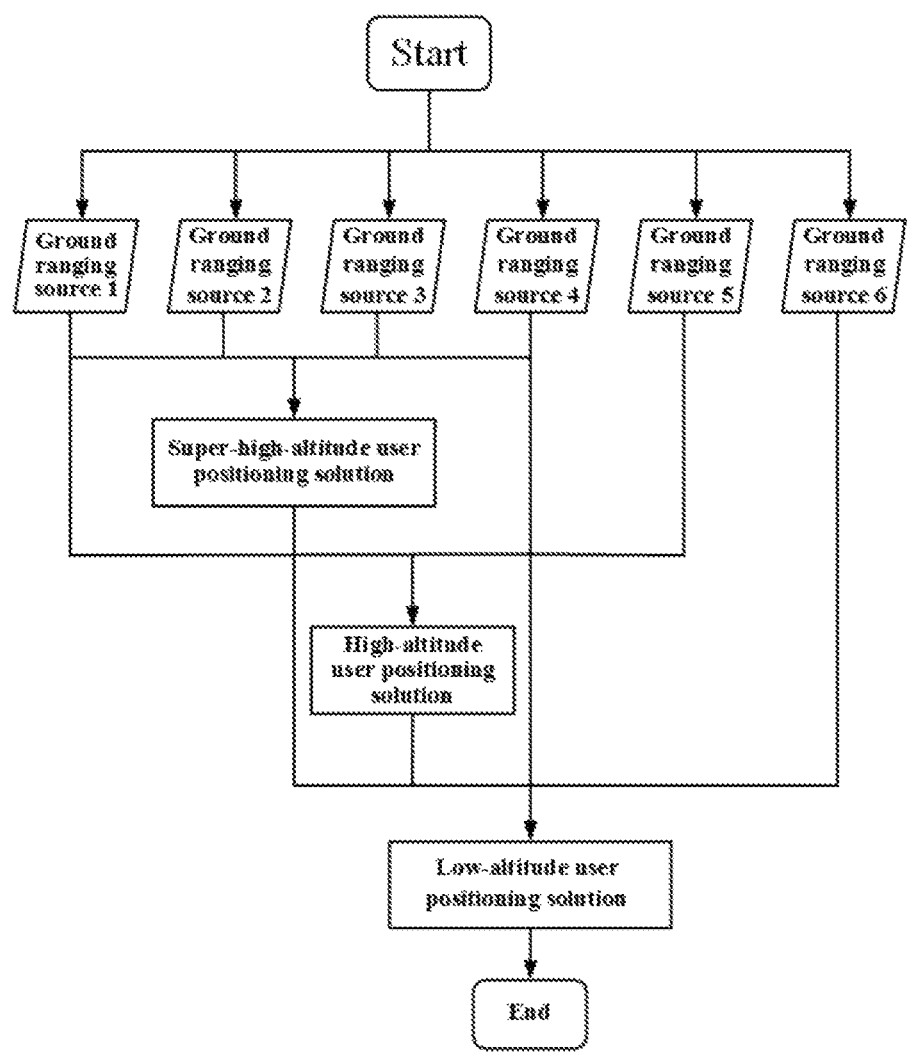
FIG. 2 is a flowchart of air-ground cooperative positioning.

Part 1: Information Exchange Based on Air-to-Air and Air-to-Ground Combined Positioning As shown in FIGS. 1-2, FIG. 1 is a scenario diagram of air-ground cooperative positioning, and FIG. 2 is a flowchart of air-ground cooperative positioning.

The cooperativity of air-to-air and air-to-ground positioning requires a group of users to have a more accurate positioning solution. Users with such an accurate positioning solution are called active users. In this embodiment, the active users with an accurate positioning solution are super-high-altitude users, and users corresponding thereto are enabled users and rejected users. The enabled users have available positioning services through enabling of air-to-air and air-to-ground ranging, while the rejected users still have no available positioning solutions. The objective of our method is to minimize the number of the rejected users in the case of large-scale interruption of GNSS services.

First of all, a set of existing distance measuring equipment stations are used as ground ranging sources, and super-high-altitude users who are not covered by terrains can be positioned. The super-high-altitude users can obtain more distance measurement values and ranging error information from the ground ranging sources, and can calculate the position solution with high accuracy. Meanwhile, the super-high-altitude users broadcast their position estimation and covariance matrix to high-altitude users and low-altitude users, becoming a super-high-altitude airborne ranging source.

Next, the high-altitude users receive the position estimation and covariance matrix broadcast by the super-high-altitude airborne ranging source, and implement air-to-air positioning in combination with a distance measurement value of LDACS two-way ranging. Meanwhile, by increasing the number of available ground ranging sources, the high-altitude users implement air-to-ground positioning according to position and error information broadcast by the available ground ranging sources and in combination with the distance measurement value of LDACS two-way ranging.

Air-to-air and air-to-ground positioning results are combined to improve the accuracy of the positioning result, and after a more accurate positioning result is obtained, the high-altitude users become a high-altitude airborne ranging source. Meanwhile, the high-altitude airborne ranging source broadcasts its position estimation and covariance matrix to the low-altitude users.

Finally, the low-altitude users implement air-to-air positioning according to the position information broadcast by the super-high-altitude airborne ranging source and the high-altitude airborne ranging source and ranging error information reflected by the covariance matrix in combination with the distance measurement value of LDACS two-way ranging.

Meanwhile, by increasing the number of ground ranging sources, the low-altitude users receive distance measurement values and error information of the ground ranging sources, and estimate their position in combination with the distance measurement value of LDACS two-way ranging, to implement air-to-ground positioning. Compared with simple air-to-air positioning, the result of low-altitude user positioning is more reliable, and the number of ground facilities is reduced.

Part 2: LDACS Two-Way Ranging Positioning Algorithm

When the GNSS is available, a user at the position x calculates his/her position solution f LDACS two-way ranging, will preferentially select a GNSS-based measurement $y_G$, and has a position error with $\varepsilon_G \sim N(0, \Sigma_G)$ distribution. When the GNSS is unavailable, the user resumes to measure $y_A$ based on the air-to-air and air-to-ground combined positioning method to estimate the position. At this time, the position error distribution is $\varepsilon_A \sim N(0, \Sigma_A)$.

In this embodiment, LDACS-based two-way ranging is used for both air-to-air positioning and air-to-ground positioning. For LDACS, EUROCONTROL first proposed it as a candidate for air-ground data link communication systems. According to different carrier modulation modes, the candidate is divided into LDACS1 developed based on a multi-carrier modulation technology and LDACS2 developed based on a single-carrier modulation technology. LDACS2 can provide a flexible scheme configuration, and the air-to-air and air-to-ground communication supported by LDACS2 is used in the present invention.

A user (aircraft) calculates a distance between the user (aircraft) and an airborne (ground) ranging source m with a LDACS two-way ranging method, and the calculation formula is as follows:

$$r^{(m)} = (x_u - x^{(m)}) \cdot 1^{(m)} + T^{(m)} + M^{(m)} + \varepsilon^{(m)} \quad (1)$$

where $x_u$ is a user aircraft position solution; $x^{(m)}$ is a ranging source position solution; $\varepsilon^{(m)}$ is a ranging error; $T^{(m)}$ is a tropospheric delay; $M^{(m)}$ is a multipath effect; $1^{(m)}$ is a line of sight (LOS) vector, which is a set of unit vectors along a connection line between the user aircraft and the ranging source.

The uncertainty of the position of the ranging source is usually similar to the order of magnitude of the ranging error in both air-to-air positioning and air-to-ground positioning. The uncertainty of the position can be thought of as an error in the ephemeris of the ranging source. It is described by adding the noise sigma r in the distance measurement to the uncertainty of the position of the ranging source along the connection line between the user receiver and the ranging source. The ranging error $\varepsilon^{(m)}$ can be approximated as a Gaussian distribution with a mean value of 0, and its variance is:

$$\sigma_{m,j}^2 = \sigma_r^2 + \|\Sigma_j \cdot 1_{m,j}\| \quad (2)$$

where $\sigma_{m,j}^2$ denotes the variance of the ranging error, $\sigma_r$ is ranging noise, and it is assumed that $\sigma_r = 10$ m; $\Sigma_j$ is a covariance matrix for calculating the position of the airborne ranging source; m denotes the airborne ranging source; and j denotes the user receiver.

The ranging error $\sigma_r$ indicates the noise of distance measurement caused by signal tracking at the receiver, and it is assumed that $\sigma_r = 10$ m in this embodiment. It should be noted that in the background of RNP operations, the tropospheric delay $T^{(m)}$ and the multipath effect $M^{(m)}$ are negligible, since they usually cause random errors of only a few orders of magnitude less than $\sigma_r$.

A new failure mode and a new potential integrity hazard are introduced into the air-ground cooperative positioning, since a fault may occur in information broadcast of the airborne ranging source. The fault here may be intentional or unintentional, but in this patent, no assumptions will be made, because the two cases are included in the same detection method. The fault $\Delta x$ of the broadcast position of the airborne ranging source is reflected in the ranging fault $\Delta r$ by projecting to the direction of the connection line between the receiver and the ranging source. Therefore, the nominal error model in the formula (1) can be supplemented by the error term $\Delta x^{(m)}$ of the position error of the airborne ranging source. Thus, the distance between the user (aircraft) and the airborne (ground) ranging source m can be calculated by the user according to the following formula under the condition of considering the specific fault of the air-ground cooperative positioning:

$$r^{(m)} = (x_u - (x^{(m)} + \Delta x^{(m)})) \cdot 1^{(m)} + \Delta r^{(m)} + \varepsilon^{(m)} \quad (3)$$

where $x_u$ is a user aircraft position solution; $x^{(m)}$ is a ranging source position solution; $\Delta x^{(m)}$ is an error term of a position error of the ranging source; $\varepsilon^{(m)}$ is a ranging error; $\Delta r^{(m)}$ is a ranging fault; $1^{(m)}$ is a line of sight (LOS) vector, which is a set of unit vectors along a connection line between the user aircraft and the ranging source; $\Delta r^{(m)}$ is a ranging fault caused by broadcast of the fault position of the airborne ranging source.

The ranging fault $\Delta r^{(m)}$ caused by broadcast of the fault position of the airborne ranging source can be considered as the projection of the fault $\Delta x^{(m)}$ at the broadcast position of the ranging source along the connection line between the user and the airborne ranging source, and its calculation formula can be expressed as:

$$\Delta r^{(m)} = \Delta x^{(m)} \cdot 1^{(m)} \quad (4)$$

where $\Delta x^{(m)}$ is the fault $\Delta x^{(m)}$ at the broadcast position of the ranging source; $1^{(m)}$ is a line of sight (LOS) vector, which is a set of unit vectors along a connection line between the user aircraft and the ranging source.

Therefore, a fault range measurement calculation formula derived from the formula (3) and the formula (4) is:

$$r^{(m)} = (x_u - x^{(m)}) \cdot 1^{(m)} + \Delta r^{(m)} + \varepsilon^{(m)} \quad (5)$$

where $r^{(m)}$ is the distance between the user (aircraft) and the airborne (ground) ranging source m calculated by the user (aircraft); $x_u$ is a user aircraft position solution; $x^{(m)}$ is a ranging source position solution; $\varepsilon^{(m)}$ is a ranging error; $1^{(m)}$ is a line of sight (LOS) vector, which is a set of unit vectors along a connection line between the user aircraft and the ranging source; $\Delta r^{(m)}$ is a ranging fault caused by broadcast of the fault position of the airborne ranging source.

In addition, by using a LDACS two-way ranging system, the aircraft can calculate its tilt range to the ranging source or a transponder by sending a query signal to the ranging source and receiving a corresponding response. The query and response signals are pulse pairs sent at different frequencies. Based on the query and response, the round-trip time is determined by the obtained transmission query time $t_1$ and the corresponding response receiving time $t_2$, and an actual distance from the aircraft to the ranging source transponder is calculated. If the signal propagation speed is v, the distance measurement value obtained accordingly is:

$$r^{(m)} = (t_2 - t_1) \times v \quad (6)$$

where $t_x$ is the time of a query; $t_2$ is the response time of a query response; v is the signal propagation speed.

Finally, the position estimation $x_u$ of the aircraft can be calculated according to the formula (5) and the formula (6), implementing a user positioning algorithm by LDACS two-way ranging.

Figure 3:
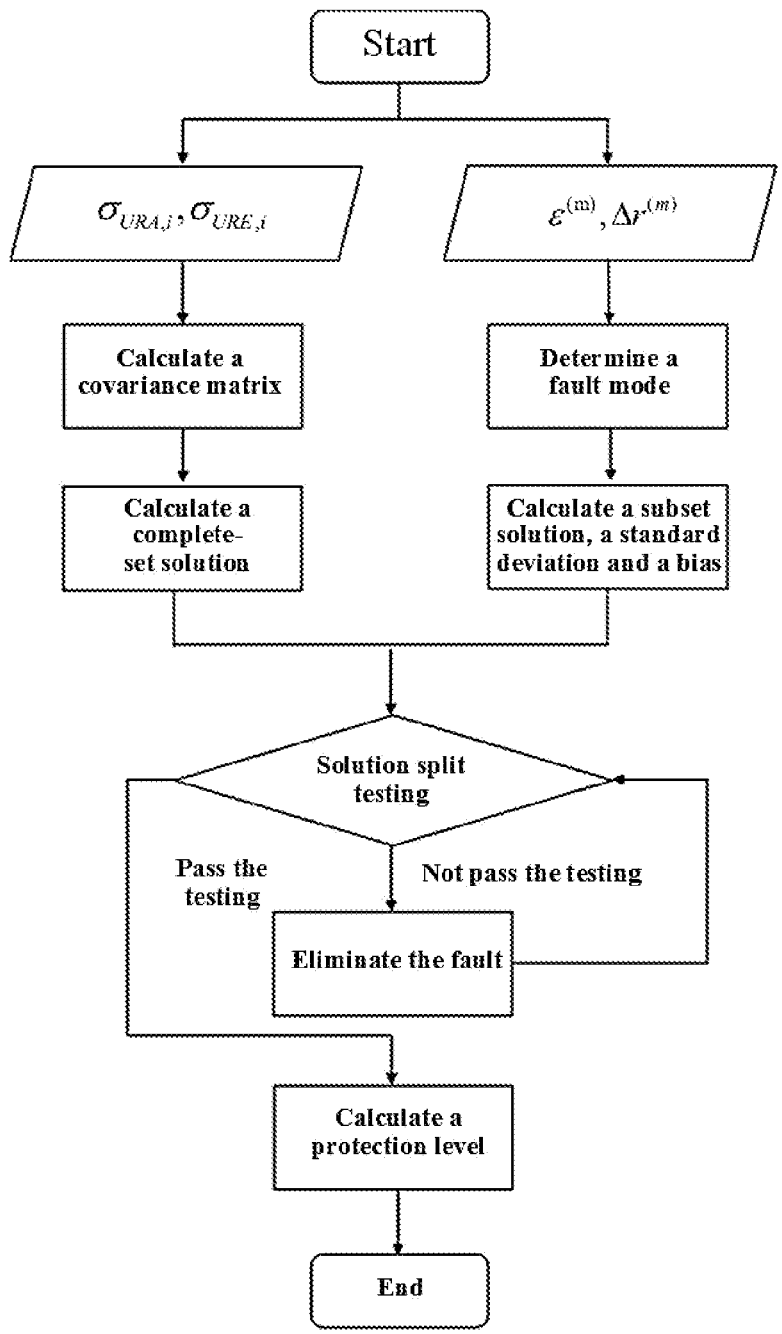
FIG. 3 is a flowchart of integrity monitoring.

Part 3: Method for Monitoring the Integrity of Air-Ground Cooperative Positioning An integrity monitoring algorithm and a protection level calculation method suitable for cooperative navigation are proposed in this part. As shown in FIG. 3, it is a flowchart of integrity monitoring. Upon specific analysis, solving steps are as follows.

Step (1): calculate positioning solutions using all ranging sources the formula for calculating the covariance matrix $\Sigma$ of the position of the ranging source is as follows:

$$\Sigma = G^T M G \quad (7)$$

A set of unit vectors $1^{(k)}$ along the connection line direction (LOS) is obtained by combining a known position of the ranging source with an assumed position of a user receiver. These vectors form a geometric matrix G. M is a weight matrix, reflecting the uncertainty of the position of the ranging source. For air-to-ground positioning, if the same technique is used for all measurements, M can be approximated as a unit matrix; for air-to-air positioning, M is equivalent to an ephemeris error in satellite navigation positioning. Therefore, Σ can be written as the following expressions:

$$\Sigma_{int} = G^T \sigma_{URE}^2 G \qquad (8)$$

$$\Sigma_{acc} = G^T \sigma_{URA}^2 G \qquad (9)$$

where $\Sigma_{int}$ is a covariance matrix representing the integrity; $\Sigma_{acc}$ is a covariance matrix representing accuracy and continuity; URE denotes a user ranging error; URA denotes user ranging accuracy.

Similar to the pseudo-distance measurement error in GNSS positioning, a distance measurement error also exists in positioning under APNT services. The difference is that it is assumed that true distance measurement values are provided for air-to-air and air-to-ground links. A ranging error is described by adding the noise or in the ranging measurement to the uncertainty of the position of the ranging source along the connection line between the range source j and the user receiver m, and a ranging error diagonal covariance matrix $C_{int}$ (integrity) and $C_{acc}$ (accuracy and continuity) are calculated as follows:

$$C_{int} = \|(G^T \sigma_{URE}^2 G) 1_{m,j}\| + \sigma_r^2 \qquad (10)$$

$$C_{acc} = \|(G^T \sigma_{URA}^2 G) 1_{m,j}\| + \sigma_r^2 \qquad (11)$$

where the ranging error $\sigma_r$ indicates the noise of distance measurement caused by signal tracking at the receiver, and it is assumed that $\sigma_r = 10$ m in this embodiment; $1_{m,j}$ denotes a unit vector along the connection line between the ranging source and the user receiver; URE denotes a user ranging error; URA denotes user ranging accuracy.

The positioning solution is calculated with the weighted least square method, and the calculation formula is as follows:

$$\hat{x} = (G^T W G)^{-1} G^T W y$$

where W is a weighted matrix, and $W = C_{int}^{-1}$;
the geometric matrix G iteratively searches for the best position estimation, and when the positioning solution converges, y is a difference between a distance measurement value, which is based on the position of the ranging source and the positioning solution, and an expected value.

Step 2: calculate a subset positioning solution, a standard deviation, and a bias component after removal of an assumed fault source Here, a positioning solution $\hat{x}^{(k)}$ after removal of an assumed fault ranging source, which is called a subset positioning solution, a positioning solution $\hat{x}^{(0)}$ using all ranging sources, which is called a complete-set positioning solution, as well as a standard deviation and a bias component need to be determined.

A residual y under a fault mode k is calculated with the weighted least square method to calculate the subset positioning solution:

$$\Delta \hat{x}^{(k)} = \hat{x}^{(k)} - \hat{x}^{(0)} = (S^{(k)} - S^{(0)}) y$$

$$S^{(k)} = (G^T W^{(k)} G)^{-1} G^T W^{(k)} \qquad (14)$$

It is set that q=1, 2, 3 in the following formula denotes east, north and high directions respectively, and the variance of the variable $\hat{x}_q^{(k)}$ is:

$$\sigma_q^{(k)2} = (G^T W^{(k)} G)_{q,q}^{-1} \qquad (15)$$

An effect of a nominal bias component $b_{nom,\,i}$ on the subset positioning solution $\hat{x}_q^{(k)}$ is as follows:

$$b_q^{(k)} = \sum_{i=1}^{N_{sat}} |S_{q,i}^{(k)}| b_{nom,i} \qquad (16)$$

An equation of the difference $\Delta \hat{x}^{(k)}$ between the subset positioning solution and the complete-set positioning solution is calculated as follows:

$$\sigma_{ss,q}^{(k)2} = e_q^T (S^{(k)} - S^{(0)}) C_{acc} (S^{(k)} - S^{(0)})^T e_q \qquad (17)$$

where $e_q$ denotes a vector in which the $q^{th}$ element is 1 and other elements are 0.

Step 3: solution split testing

For the fault mode k, $\hat{x}_q^{(0)}$ is a fault-free positioning solution, and $x_q$ is an actual position; $\hat{x}_q^{(k)}$ is a positioning solution of a detection subset k after removal of the $k^{th}$ measured value, wherein q=1,2, 1 and 2 denote two directional components of the horizontal plane respectively; and a difference $\nabla x_q$ between an estimated position $\hat{x}_q^{(k)}$ and an actual position $\hat{x}_q^{(0)}$ is:

$$\nabla x_q = \hat{x}_q^{(0)} - x_q \qquad (18)$$

Test statistics $t_{k,q}$ under the fault mode k is:

$$t_{k,q} = |\hat{x}_q^{(k)} - \hat{x}_q^{(0)}| \qquad (19)$$

A threshold $T_{k,q}$ of the test statistics under the fault mode k is:

$$T_{k,q} = K_{fa,q} \sigma_{ss,q}^{(k)2} \qquad (20)$$

where $K_{fa,q}$ is an inverse function (quantile) of a probability cumulative distribution function, and the specific value is determined by a continuity risk assigned to the fault mode k.

$$\tau_k = \frac{|\hat{x}^{(k)} - \hat{x}^{(0)}|}{T_k} \leq 1 \qquad (21)$$

$$K_{fa,q} = Q^{-1}\left(\frac{P_{fa}^{(k)}}{4}\right) \qquad (22)$$

$P_{fa}^{(k)}$ is a continuity budget assigned to the fault mode k, $Q^{-1}(p)$ is (1−p) quantile of standard Gaussian distribution, $T_k$ is test statistics, and if the test statistics $T_k$ is greater than 1, the assumption of the fault mode is established, and a fault exists in the correspondingly removed ranging source.

Step 4: Protection level solution

If the above step is passed, the protection level is further solved, the protection level is an important parameter to evaluate availability, and a horizontal protection level (HPL) and a vertical protection level (VPL) are calculated as follows respectively under APNT services:

$$VPL = \kappa_{(PL)} \cdot \sigma_q^{(k)} \qquad (23)$$

$$HPL = \kappa_{(PL)} \cdot \sqrt{S^{(k)} \cdot \sigma_q^{2(k)}} + \Sigma_i |S^{(k)} \cdot b_{nom}| \qquad (24)$$

An error boundary is the basis of HPL calculation, errors are classified into random and bias components, which are denoted by $\sigma_q^{(k)}$ and $b_{nom}$ respectively, and each $\sigma_q^{(k)}$ is a standard deviation of Gaussian distribution. $b_{nom}$ is a bias component, $\sigma_q^{(k)}$ is a standard deviation of the subset solution of Gaussian distribution, and $\kappa_{(PL)}$ is an inflation factor with the value of 5.33. The correlation between the errors is reflected in the weighted matrix W, which is the inverse of the correlation matrix, and the geometric matrix is used to calculate S.

Finally, the availability of the system can be judged by comparing the protection level with a corresponding alarm limit, and if the protection level is less than the alarm limit, the complete-set solution will be taken as the positioning solution; otherwise, the system will be indicated to be unavailable.

Part 4: Analysis on the Complexity of Integrity Monitoring

The complexity of integrity monitoring in the navigation process is evaluated in this part for the information exchange principle and positioning equations under air-to-air and air-to-ground combined positioning proposed in the previous part and the corresponding integrity monitoring algorithm. A specific method for evaluating the complexity is as follows.

To investigate the complexity of APNT service integrity monitoring under air-to-air and air-to-ground combined positioning conditions, a chi-square test threshold $T_{\chi^2}$ is used as a measurement index, and $T_{\chi^2}$ is calculated as follows:

$$F(T_{\chi^2}, n-3-N_{rs}) = 1 - P_{FA\_CHI2} \quad (25)$$

where the operator F(u, deg) is a cumulative distribution function of chi-square distribution of which the degree of freedom is deg; $N_{rs}$ is the number of ranging sources with a simultaneous fault; n is the total number of the ranging sources.

Next, integrity monitoring thresholds $T_{\chi^2}$ of APNT services at different positions in a country or region are summarized for analysis. The region is first divided into grids to obtain a series of integrity monitoring thresholds $T_1$, $T_2$, $T_3$, ..., $T_n$, and then a change rate of the complexity of the integrity monitoring is defined as the following formula:

$$\Delta = \frac{1}{n-1} \sum_i^n [T_i - \overline{T}]^2 \quad (26)$$

the closer $\Delta$ is to 0, the smaller the change amplitude of the overall data is, and it is easier to implement the integrity monitoring in a large area; otherwise, it is somewhat complex to implement the integrity monitoring in a large area.

Other embodiments of the invention are easily thought of and understood by those skilled in the art in combination with the descriptions and practice of the present invention disclosed here. The descriptions and embodiments are only considered to be exemplary and the true scope and subject matter of the present invention are defined by the claims.

What is claimed is:

1. A LDACS-based air-ground cooperative positioning method, wherein in the positioning method, aircrafts are classified into three levels, super-high altitude, high altitude, and low altitude, and air-ground cooperative positioning is implemented through information exchange among the three levels, comprising the following steps of:
   locating the super-high-altitude aircrafts by using an existing ground ranging source, wherein the existing ground ranging source is a distance measuring equipment station, and each of the super-high-altitude aircrafts obtains information from the existing ground ranging source to obtain a high-accuracy position solution;
   broadcasting, by a transceiver of each of the super-high-altitude aircrafts, corresponding position information and a corresponding covariance matrix to the high-altitude aircrafts and the low-altitude aircrafts, wherein each of the super-high-altitude aircrafts broadcasting the corresponding position information and the corresponding covariance matrix becomes a super-high-altitude airborne ranging source;
   receiving, by a transceiver of each of the high-altitude aircrafts, the position information and the covariance matrix broadcast by the super-high-altitude aircrafts, and implementing, by each of the high-altitude aircrafts, air-to-air positioning according to the position information broadcast by the super-high-altitude aircrafts and ranging error information reflected by the covariance matrix broadcast by the super-high-altitude aircrafts in combination with a distance value measured by a LDACS two-way ranging method;
   increasing the number of available ground ranging sources by providing additional distance measuring equipment stations to the existing ground ranging source;
   receiving, by each of the high-altitude aircrafts, distance measurement values and error information of the available ground ranging sources, and implementing, by each of the high-altitude aircrafts, air-to-ground positioning by estimating a corresponding position according to the position and error information of the available ground ranging sources received and in combination with the distance value measured by the LDACS two-way ranging method;
   combining, by each of the high-altitude aircrafts, results of the air-to-air positioning and the air-to-ground positioning to obtain a more accurate positioning result and improve the accuracy of the positioning result;
   after obtaining the more accurate positioning result is obtained, broadcasting, by the transceiver of each of the high-altitude aircrafts, corresponding position information and a corresponding covariance matrix to the low-altitude aircrafts, wherein each of the high-altitude aircrafts broadcasting the corresponding position information and the corresponding covariance matrix becomes a high-altitude airborne ranging source;
   receiving, by a transceiver of each of the low-altitude aircrafts, the position information and the covariance matrix broadcast by the super-high-altitude aircrafts and the high-altitude aircrafts, and implementing, by each of the low-altitude aircrafts, air-to-air positioning according to the position information broadcast by the super-high-altitude aircrafts and the high-altitude aircrafts and ranging error information reflected by the covariance matrix broadcast by the super-high-altitude aircrafts and the high-altitude aircrafts in combination with the distance value measured by the LDACS two-way ranging method;
   receiving, by each of the low-altitude aircrafts, distance measurement values and error information of the available ground ranging sources, and implementing, by each of the low-altitude aircrafts air-to-ground positioning by estimating a corresponding position according to the position and error information of the available ground ranging sources received and in combination with the distance value measured by the LDACS two-way ranging method; and combining, by each of the low-altitude aircrafts, results of the air-to-air positioning and the air-to-ground positioning to obtain a more accurate positioning result.

2. The LDACS-based air-ground cooperative positioning method as described in claim 1, wherein, in the LDACS two-way ranging method, a distance between a ranging source and an aircraft is estimated according to the following formula:

$$-C \times C$$

where is the time of a query; is the response time of a query response; is a signal propagation speed.

3. The LDACS-based air-ground cooperative positioning method as described in claim 1, wherein, a distance between the ranging source and an aircraft is calculated according to an aircraft position solution, a ranging source position solution, and an error, and a specific calculation formula is as follows:

$$^C CC\text{-}C^C C \cdot 1^C C^C C^C C^C$$

where is a aircraft position solution; $x^C$ is a ranging source position solution; $\varepsilon^C$ is a ranging error; $^C$ is a tropospheric delay; $M^{(m)}$ is a multipath effect; $1^{(m)}$ is a line of sight (LOS) vector, which is a set of unit vectors along a connection line between the user aircraft and the ranging source;

the tropospheric delay $^C$ and the multipath effect $M^{(m)}$ are negligible.

4. The LDACS-based air-ground cooperative positioning method as described in claim 3, wherein, after a new fault mode and an integrity hazard are introduced into the air-ground cooperative positioning method, the distance between the ranging source and the aircraft is calculated according to the following formula:

$$^C CC\text{ -}CC^C CC^C CC \cdot 1^C CC^C C^C$$

where is a aircraft position solution; $x^C$ is a ranging source position solution; $^C$ is an error term of a position error of the ranging source; $\varepsilon^C$ is a ranging error; $\Delta r^{(C}$ is a ranging fault; $1^{(m)}$ is a line of sight (LOS) vector, which is a set of unit vectors along a connection line between the user aircraft and the ranging source;

the ranging fault $\Delta r^{(C}$ satisfies the formula: $\Delta r^C C^C \cdot 1^C$, and then a fault range measurement formula is obtained specifically as follows:

$$r^C C\text{-}x^C C \cdot 1^C + \Delta r^C + \varepsilon^C.$$

5. The LDACS-based air-ground cooperative positioning method as described in claim 3, wherein, the ranging error $\varepsilon^C$ follows a Gaussian distribution with a mean value of 0, and the variance of the ranging error $\varepsilon^C$ is in line with the formula: $_{C\,C}C + C\Sigma \cdot 1_{C\,C}$, where $_{C\,C}$ denotes the variance of the ranging error, is ranging noise, and $=10$ m.

6. A method for monitoring the integrity of a LDACS-based air-ground cooperative positioning method as recited in claim 1, wherein, the method for monitoring the integrity comprises the following steps of:

a) calculating positioning information of each of the aircrafts using all ranging sources, comprising:

the calculation formula of the covariance matrix $\Sigma$ of the position of the ranging source being as follows:

$$\Sigma = G$$

where M is a weight matrix, reflecting the uncertainty of the position of the ranging source; G is a geometric matrix, consisting of a set of unit vectors $^C$ along the connection line direction (LOS) obtained by combining a known position of the ranging source with an assumed position of a receiver of an aircraft;

wherein, for air-to-ground positioning, if the same technique is used for all measurements, M is approximated as a unit matrix; for air-to-air positioning, M is equivalent to an ephemeris error in satellite navigation positioning; therefore, expressions of a ranging source position covariance matrix $\Sigma$ representing the integrity and a ranging source position covariance matrix $\Sigma$ representing accuracy and continuity are as follows:

$$\Sigma_{int} = G\,\sigma$$

$$\Sigma_{acc} = G\,\sigma$$

during the positioning, the ranging error is described by adding the noise $\sigma_r$ in the ranging measurement to the uncertainty of the position of the ranging source along the connection line between the range source j and the receiver m, and a ranging error diagonal covariance matrix $C_{int}$ (integrity) and $C_{acc}$ (accuracy and continuity) are calculated as follows:

$$\|C\,\sigma\,C_{C\,C}\| + \sigma$$

$$\|C\,\sigma\,C_{C\,C}\| + \sigma$$

where $\sigma_r$ is ranging error, indicating the noise of distance measurement caused by signal tracking at the receiver, and it is assumed that $\sigma_r = 10$ m; $_{C\,C}$ denotes a unit vector along the connection line between the ranging source and the receiver, the positioning information is calculated with the weighted least square method, and the calculation formula is as follows:

$$\mathbf{C}\ _{C\,C\,C}$$

where W is a weighted matrix, and the geometric matrix G iteratively searches for the best position estimation, and when the positioning solution converges, y is a difference between a distance measurement value, which is based on the position of the ranging source and the positioning solution, and an expected value;

b) calculating a subset positioning solution, a standard deviation, and a bias component after removal of an assumed fault source, comprising:

calculating a residual y under a fault mode k with the weighted least square method to calculate the subset positioning solution:

$$\Delta \hat{x}^{(k)} = \hat{x}^{(k)} - \hat{x}^{(0)} = (S^{(k)} - S^{(0)})y$$

$$S^{(k)} = (G^T W^{(k)} G)^{-1} G^T W^{(k)}$$

where $^C$ is a positioning solution after removal of an assumed fault ranging source, which is a subset positioning solution, $^C$ is a positioning solution using all ranging sources, which is a complete-set positioning solution; S is a transfer matrix;

wherein the variance of the subset positioning solution $\hat{x}_q^{(k)}$ is:

$$_{C\,C}C^C C_{C\,C}$$

where q=1, 2, 3 denotes east, north and high directions respectively;

an effect of a nominal bias component $b_{nom,i}$ on the subset positioning solution $C$ is as follows:

$$^C CCC^C_{CC}ccc\ c$$

an equation of the difference $\Delta\hat{x}^{(k)}$ between the subset positioning solution and the complete-set positioning solution is calculated as follows:

$$^c_{cc}{}^c_c\ C\ C^C - C^C\ C\ C^C - C^C$$

where e denotes a vector in which the $q^{th}$ element is 1 and other elements are 0;

c) conducting split testing on the positioning solution to judge whether a protection level is solved, and if yes, solving the protection level, comprising:

for the fault mode k, $^C$ being a fault-free positioning solution, and $x_q$ being an actual position; $^C$ being a positioning solution of a detection subset k after removal of the $k^{th}$ measured value, wherein q=1,2, 1 and 2 denote two directional components of the horizontal plane respectively; and a difference VC between an estimated position c and an actual position $^C$ is:

$$\mathbf{C}\ ^C{-C}$$

test statistics $t_{k,q}$ under the fault mode k is:

$$_{c\ c}\ \mathbf{C}\ ^C - \mathbf{C}\ ^c$$

a threshold $T_{k,q}$ of the test statistics under the fault mode k is:

$$cc\ C_{ccc}\ ^c_{cc}\,^c_c$$

where $_{cc\ c}$ is an inverse function (quantile) of a probability cumulative distribution function, the specific value is determined by a continuity risk assigned to the fault mode k, and calculation formulas of the continuity risk are as follows:

$$\frac{c\ c}{\ } \leq 1\ cc\ c\ C\ \frac{c}{\ }$$

$^C$ is a continuity budget assigned to the fault mode k, $Q^{-1}(p)$ is $(1-p)$ quantile of standard Gaussian distribution, $\tau$ is test statistics, and if the test statistics $\tau$ is greater than 1, the assumption of the fault mode is established, and a fault exists in the correspondingly removed ranging source;

the protection level is further solved, the protection level is an important parameter to evaluate availability, and a horizontal protection level (HPL) and a vertical protection level (VPL) are calculated as follows respectively under APNT services:

$$\frac{CCC\ C_{CC} \cdot C^C}{CCC\ C_{CC} \cdot {}^C \cdot C^C\ C\ CC^C \cdot C|}$$

where is a bias component, $^C$ is a standard deviation of the subset solution of Gaussian distribution, and $_{CC}$ is an inflation factor with the value of 5.33;

the availability of the system is judged by comparing the protection level with a corresponding alarm limit, and if the protection level is less than the alarm limit, the complete-set solution will be taken as the positioning information; otherwise, the system will be indicated to be unavailable.

7. The method for monitoring the integrity of a LDACS-based air-ground cooperative positioning method as described in claim 6, wherein, whether the integrity monitoring is easily implemented in a large area needs to be judged by the complexity of the integrity monitoring.

8. The method for monitoring the integrity of a LDACS-based air-ground cooperative positioning method as described in claim 7, wherein, a chi-square test threshold $T_{\chi^2}$ is used as a measurement index for the complexity of the integrity, and $T_{\chi^2}$ is calculated as follows:

$$,C{-}3{-}C\ C{=}1{-}C_{CC\ cc\ cc}$$

where the operator F(u, deg) is a cumulative distribution function of chi-square distribution of which the degree of freedom is deg; $N_{rs}$ is the number of ranging sources with a simultaneous fault; n is the total number of the ranging sources;

integrity monitoring thresholds $T_{\chi^2}$ of APNT services at different positions in a region are summarized for analysis, the region is divided into grids to obtain a series of integrity monitoring thresholds $T_1, T_2, T_3, T_n$, and then a change rate of the complexity of the integrity monitoring is defined as the following formula:

$$\Delta = \frac{1}{n-1}\sum_i^n [T_i - \overline{T}]^2$$

the closer $\Delta$ is to 0, the smaller the change amplitude of the overall data is, and it is easier to implement the integrity monitoring in a large area; otherwise, it is somewhat complex to implement the integrity monitoring in a large area.

* * * * *